United States Patent [19]
Bonser

[11] Patent Number: 5,711,553
[45] Date of Patent: Jan. 27, 1998

[54] QUICK CONNECT FLUID COUPLING

[75] Inventor: Harvey S. Bonser, Redford, Mich.

[73] Assignee: STMC-LLC, Farmington, Mich.

[21] Appl. No.: 708,336

[22] Filed: Sep. 4, 1996

[51] Int. Cl.[6] ..................................... F16L 39/00
[52] U.S. Cl. ..................... 285/319; 285/906; 285/921
[58] Field of Search ............................. 285/319, 320, 285/921, 906

[56] References Cited

U.S. PATENT DOCUMENTS

| | | |
|---|---|---|
| 2,550,591 | 4/1951 | Parsons ..................................... 285/319 |
| 4,423,892 | 1/1984 | Bartholomew . |
| 4,601,497 | 7/1986 | Bartholomew . |
| 4,635,974 | 1/1987 | Moussaian . |
| 4,637,640 | 1/1987 | Fournier et al. . |
| 4,750,765 | 6/1988 | Cassidy et al. . |
| 4,793,639 | 12/1988 | Glover et al. . |
| 4,828,297 | 5/1989 | Tarum . |
| 4,832,378 | 5/1989 | Zepp . |
| 4,834,423 | 5/1989 | DeLand . |
| 4,844,512 | 7/1989 | Gahwiler . |
| 4,850,621 | 7/1989 | Umehara . |
| 4,863,202 | 9/1989 | Oldford . |
| 4,867,484 | 9/1989 | Guest . |
| 4,867,487 | 9/1989 | Phillis . |
| 4,874,174 | 10/1989 | Kojima et al. . |
| 4,875,709 | 10/1989 | Caroll et al. . |
| 4,889,368 | 12/1989 | Laipply . |
| 4,895,395 | 1/1990 | Ceriani . |
| 4,913,467 | 4/1990 | Washizu . |
| 4,915,136 | 4/1990 | Bartholomew . |
| 4,915,420 | 4/1990 | Washizu . |
| 4,915,421 | 4/1990 | Dennany Jr. . |
| 4,919,457 | 4/1990 | Moretti . |
| 4,923,220 | 5/1990 | Guest et al. . |
| 4,923,228 | 5/1990 | Laipply . |
| 4,925,217 | 5/1990 | Ketcham . |
| 4,929,002 | 5/1990 | Sauer ..................................... 285/319 |
| 4,936,544 | 6/1990 | Bartholomew . |
| 4,944,537 | 7/1990 | Usui et al. . |
| 4,946,176 | 8/1990 | Bartholomew . |
| 4,948,180 | 8/1990 | Usui et al. . |
| 4,964,658 | 10/1990 | Usui et al. ..................... 285/921 X |
| 4,969,667 | 11/1990 | Sauer ..................... 285/319 X |
| 4,991,880 | 2/1991 | Bernart . |
| 4,993,756 | 2/1991 | Bechu . |
| 4,997,216 | 3/1991 | Washizu . |
| 5,028,080 | 7/1991 | Dennany, Jr. . |
| 5,040,831 | 8/1991 | Lewis . |
| 5,048,875 | 9/1991 | Usui et al. . |
| 5,069,424 | 12/1991 | Dennany, Jr. et al. . |
| 5,074,601 | 12/1991 | Spors et al. . |
| 5,084,954 | 2/1992 | Klinger . |
| 5,090,745 | 2/1992 | Kluger . |
| 5,090,748 | 2/1992 | Usui et al. . |
| 5,094,481 | 3/1992 | Takikawa et al. . |
| 5,096,235 | 3/1992 | Oetiker . |
| 5,098,136 | 3/1992 | Washizu . |
| 5,104,157 | 4/1992 | Bahner . |
| 5,112,085 | 5/1992 | Busch et al. . |
| 5,112,089 | 5/1992 | Richard . |
| 5,114,250 | 5/1992 | Usui . |
| 5,127,682 | 7/1992 | Washizu . |
| 5,131,691 | 7/1992 | Washizu . |
| 5,135,268 | 8/1992 | McNaughton et al. . |
| 5,141,264 | 8/1992 | Usui . |
| 5,152,555 | 10/1992 | Szabo . |
| 5,154,450 | 10/1992 | Washizu . |
| 5,154,451 | 10/1992 | Washizu . |
| 5,160,177 | 11/1992 | Washizu . |

(List continued on next page.)

*Primary Examiner*—Dave W. Arola
*Attorney, Agent, or Firm*—Brooks & Kushman P.C.

[57] ABSTRACT

A quick connect fluid coupling (20) includes an attachment clip (30) for securing a female connector member (22) and a tube member (26) to each other. The attachment clip (30) has a central portion (32) including an opening (34) that receives one of the members and engages an attachment surface (48) thereof and also has flat attachment legs (36) that extend from the central portion (32). Each attachment leg (36) has a window (38) including an attachment edge (40) that engages an attachment surface (46) on the other member between inner and outer portions (50) and (52).

15 Claims, 3 Drawing Sheets

U.S. PATENT DOCUMENTS

| | | |
|---|---|---|
| 5,161,832 | 11/1992 | McNaughton et al. . |
| 5,161,833 | 11/1992 | McNaughton et al. . |
| 5,161,834 | 11/1992 | Norkey . |
| 5,163,719 | 11/1992 | Washizu . |
| 5,163,720 | 11/1992 | Abe . |
| 5,171,028 | 12/1992 | Bartholomew . |
| 5,176,412 | 1/1993 | Washizu . |
| 5,178,424 | 1/1993 | Klinger . |
| 5,181,751 | 1/1993 | Kitamura . |
| 5,195,787 | 3/1993 | Bartholomew . |
| 5,213,376 | 5/1993 | Szabo . |
| 5,226,682 | 7/1993 | Marrison et al. . |
| 5,228,728 | 7/1993 | McNaughton et al. . |
| 5,248,168 | 9/1993 | Chichester et al. . |
| 5,257,833 | 11/1993 | McNaughton et al. . |
| 5,261,707 | 11/1993 | Kotake et al. . |
| 5,261,709 | 11/1993 | McNaughton et al. . |
| 5,269,571 | 12/1993 | Haggard . |
| 5,275,443 | 1/1994 | Klinger . |
| 5,275,448 | 1/1994 | McNaughton et al. . |
| 5,277,402 | 1/1994 | Szabo . |
| 5,284,369 | 2/1994 | Kitamura . |
| 5,292,157 | 3/1994 | Rubichon . |
| 5,314,216 | 5/1994 | Umezawa . |
| 5,320,390 | 6/1994 | Kokama et al. . |
| 5,324,080 | 6/1994 | McNaughton et al. . |
| 5,324,081 | 6/1994 | Umezawa . |
| 5,328,216 | 7/1994 | Miyauchi et al. . |
| 5,338,073 | 8/1994 | Washizu et al. . |
| 5,340,167 | 8/1994 | Morese . |
| 5,342,095 | 8/1994 | Klinger et al. . |
| 5,348,353 | 9/1994 | Deweerdt . |
| 5,350,203 | 9/1994 | McNaughton et al. . |
| 5,354,102 | 10/1994 | Carman . |
| 5,354,103 | 10/1994 | Torrence et al. . |
| 5,354,106 | 10/1994 | Washizu et al. . |
| 5,366,259 | 11/1994 | Hohmann et al. . |
| 5,370,423 | 12/1994 | Guest . |
| 5,374,084 | 12/1994 | Potoker ............................ 285/319 X |
| 5,374,088 | 12/1994 | Moretti et al. . |
| 5,375,892 | 12/1994 | Keuper et al. . |
| 5,378,024 | 1/1995 | Kumagai et al. . |
| 5,378,025 | 1/1995 | Szabo . |
| 5,388,870 | 2/1995 | Bartholomew . |
| 5,390,969 | 2/1995 | Guest . |
| 5,405,175 | 4/1995 | Bonnah, II et al. . |
| 5,413,387 | 5/1995 | Bartholomew . |
| 5,421,622 | 6/1995 | Godeau . |
| 5,425,558 | 6/1995 | Dennany, Jr. . |
| 5,609,370 | 3/1997 | Szabo et al. . | ns
QUICK CONNECT FLUID COUPLING

TECHNICAL FIELD

This invention relates to a quick connect fluid coupling.

BACKGROUND ART

Quick connect fluid couplings are used extensively in connection with vehicle brakes, transmissions and fuel systems. Such fluid couplings conventionally include a female connector member having a central passage as well as including a tube member that has an annular flange and is received by the passage of the female connector member in fluid communication therewith and with an O-ring normally providing a fluid-tight seal between the members. An attachment clip is conventionally used to detachably secure the tube member flange and the female connector member to each other. Such attachment clips as disclosed by U.S. Pat. No. 5,005,878 Smith often have a generally U-shape that is snapped around the members from one side with a construction that can unintentionally become disconnected. Another type of attachment clip such as disclosed by U.S. Pat. Nos. 4,844,515 Field, 4,929,002 Sauer, 5,228,729 McElroy et al and 5,303,963 McNaughton et al have bent tabs that secure a connection between the female connector member and the tube member; however, such bent tabs are susceptible to further bending upon the application of a disconnect force and thus have limited strength in preventing forced withdrawal of the tube member from the female connector member.

DISCLOSURE OF INVENTION

An object of the present invention is to provide an improved quick connect fluid coupling.

In carrying out the above object, the quick connect fluid coupling of the invention includes a female connector member having a central passage and also includes a tube member that has an annular flange and is received by the passage of the female connector member in fluid communication therewith so as to be capable of transmitting fluid pressure and containing fluid flow such as often is necessary with vehicle brakes, transmissions and fuel systems, etc. The quick connect fluid coupling also includes an attachment clip having a central portion including an opening for receiving one of the members and having a plurality of flat attachment legs extending from the central portion in a spaced relationship to each other. Each leg has a window including an attachment edge located within the plane of its flat shape. Each attachment edge has opposite ends and an intermediate portion that extends between the ends thereof and that projects from the ends thereof toward the central portion. The female connector member and the annular flange of the tube member each have an associated attachment surface. The attachment surface of one of the members is engaged by the central portion of the attachment clip. The attachment surface of the other member has an inner portion that is engaged by the intermediate portions of the attachment edges of the windows in the legs of the attachment clip to secure the female connector member and the tube member to each other. The attachment surface of the other member has an outer portion that is located outwardly from the inner portion thereof and farther from the central portion of the attachment clip than its inner portion.

With the construction defined above, the attachment clip can be easily connected and when necessary readily disconnected by outward movement of the legs of the attachment clip but nevertheless has great strength in preventing unintended disconnecting when force is exerted in attempt to pull the tube member from the female connector member.

In the most preferred construction of the quick connect fluid coupling, the first mentioned attachment surface is on the tube member and the second mentioned attachment surface is on the female connector member. Thus, with this embodiment, the tube member extends through the opening of the central portion of the attachment clip and the central portion of the attachment clip thus engages the attachment surface on the annular flange of the tube member, while the attachment edges of the windows in the legs of the attachment clip engage the attachment surface on the female connector member. In an alternate embodiment, the first mentioned attachment surface is on the female connector member and the second mentioned attachment surface is on the tube member. Thus, with this alternate embodiment, the female connector member extends through the opening in the central portion of the attachment clip and the central portion engages the attachment surface on the female connector member, while the attachment edges of the windows in the legs of the attachment clip engage the attachment surface on the annular flange of the tube member.

The disclosed attachment clip includes a pair of the attachment legs located on opposite sides of the female connector. Two different embodiments of the attachment clip each includes a pair of positioners respectively located between the pair of attachment legs. In one embodiment, each positioner includes a pair of opposite ends for respectively engaging the pair of attachment legs and each positioner also engages the other member having the second mentioned attachment surface. The other embodiment has each positioner constructed to include a pair of distal ends that are spaced from the pair of attachment legs and that engage the other member having the second mentioned attachment surface.

In the preferred construction, the intermediate portion of the attachment edge of the window in each leg of the attachment clip has a curved shape extending between the ends of the attachment edge. The window of each leg also has side edges that respectively extend from the opposite ends of the attachment edge and that taper toward each other. The window of each leg also has a curved connection edge that connects the side edges thereof in a spaced relationship from the attachment edges thereof from whose ends the side edges extend.

Different embodiments are disclosed of the attachment surface that is engaged by the attachment edge of the window in each leg. In one embodiment, that attachment surface has a frustoconical shape and in another embodiment has an annular construction with a curved shape in a cross-sectional direction.

Different constructions of the female connector member are also disclosed. In one construction, the female connector member has a mounting end for providing mounting thereof during use. In another construction, the female connector member has a mounting end that is formed in situ with an object for mounting thereof during use.

The objects, features and advantages of the present invention are readily apparent from the following detailed description of the best mode for carrying out the invention when taken in connection with the accompanying drawings.

BRIEF DESCRIPTION OF DRAWINGS

FIG. 4 is an exploded perspective view of another embodiment of a quick connect fluid coupling constructed in accordance with the present invention but with the position of the attachment clip reversed from the embodiments illustrated in FIGS. 1, 2 and 2a.

BEST MODES FOR CARRYING OUT THE INVENTION

Figure 1:
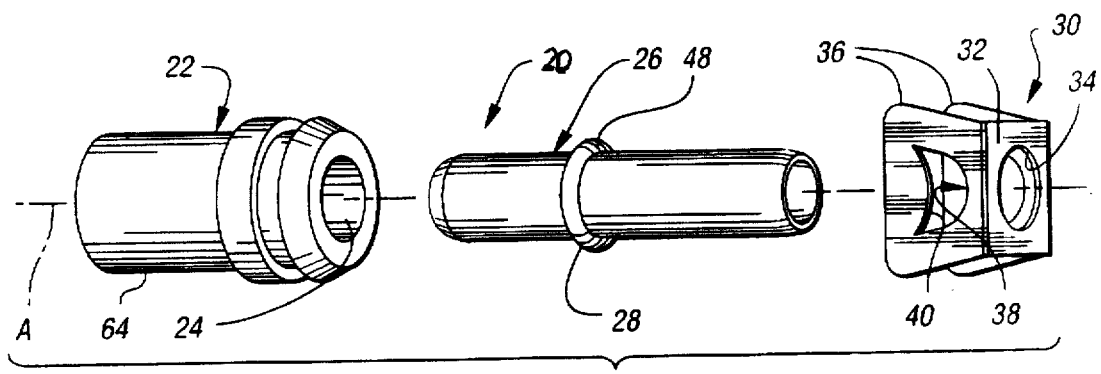
FIG. 1 is an exploded perspective view of a female connector member, a tube member and an attachment clip of one embodiment of a quick connect fluid coupling constructed in accordance with the present invention.
Figure 2:
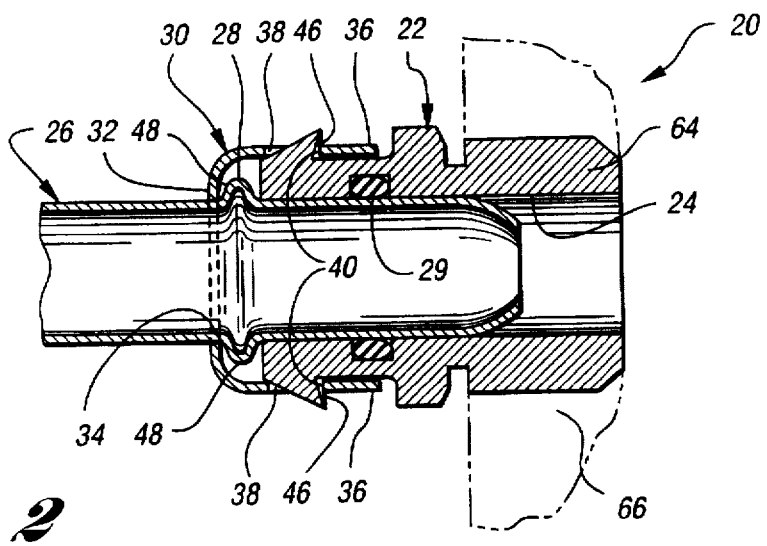
FIG. 2 is a longitudinal sectional view through the assembled fluid coupling illustrated in FIG. 1 and shows its female connector member mounted by a mounting end thereof on a phantom line indicated object with which the fluid coupling is to be utilized.

With reference to FIGS. 1 and 2 of the drawings, one embodiment of a quick connect fluid coupling constructed in accordance with the present invention is generally indicated by 20. This fluid coupling includes a female connector member 22 having a central passage 24 along a central axis A of the coupling. Fluid coupling 20 also includes a tube member 26 that has an annular flange 28 and that is received within the passage 24 of the female connector member 22 in fluid communication therewith as illustrated in FIG. 2. An O-ring 29 received within an annular groove in the passage 24 of the female connector member 22 seals against the tube 26 in a fluid-tight manner.

Figure 3:
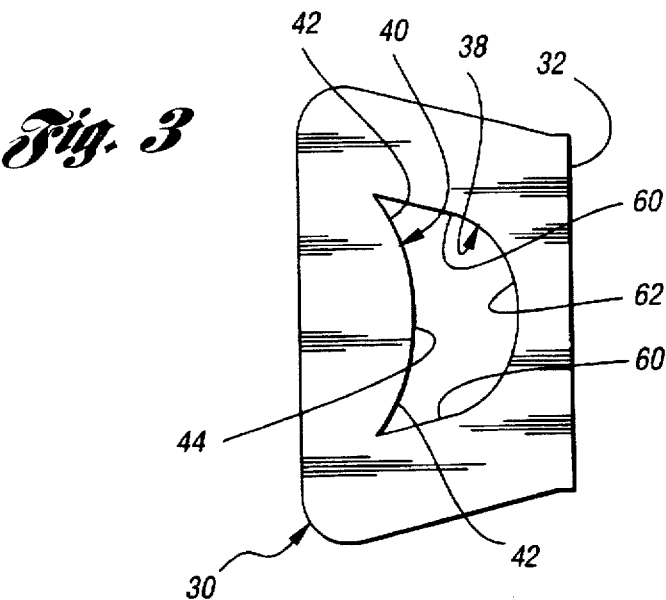
FIG. 3 is an enlarged side view illustrating the attachment clip whose flat attachment legs each include a window having an attachment edge.

With continuing reference to FIGS. 1 and 2 and additional reference to FIG. 3, an attachment clip 30 of the fluid coupling 20 has a central portion 32 including an opening 34 for receiving one of the members which in this embodiment is the tube member 26 as shown by the assembled view of FIG. 2. A plurality of flat attachment legs 36 of attachment clip 30 extend from the central portion 32 in a spaced relationship to each other. Each leg 36 has a window 38 including an attachment edge 40 that is best illustrated in FIG. 3 and that is located within the plane of the flat shape of the leg. Each attachment edge 40 has opposite ends 42 and an intermediate portion 44 that extends between the ends thereof and that projects from the ends thereof toward the central portion 32 of the attachment clip from which the legs 36 project.

Figure 10:
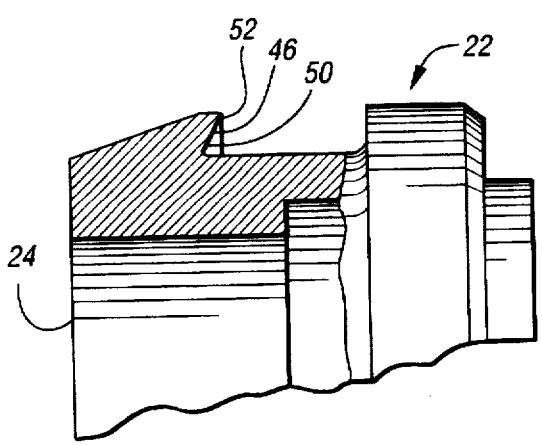
FIG. 10 is a partial view taken partially in section to illustrate one embodiment of the female connector member whose attachment surface has a frustoconical shape.

With combined reference to FIGS. 1, 2 and 10, the female connector member 22 and the annular flange 28 of the tube member 26 each have an associate attachment surface 46 and 48. The attachment surface of one of the members which in this embodiment is the attachment surface 48 of the tube member 26 is engaged by the central portion 32 of the attachment clip 30 as illustrated in FIG. 2. The attachment surface of the other member which in this embodiment is the attachment surface 46 of the female connector member 22 has an inner portion 50 (FIG. 10) that is engaged by the intermediate portions 44 of the attachment edges 40 of the windows 38 in the legs 36 of the attachment clip to secure the female connector member and the tube member to each other as best illustrated in FIG. 2. The latter mentioned attachment surface 46 of the female connector member 22 as shown in FIG. 10 has an outer portion 52 that is located outwardly from the inner portion 50 thereof and in the assembled condition of the coupling is located farther from the central portion 32 of the attachment clip than its inner portion.

The construction of the fluid coupling as described above allow a quick connection as the tube member 26 is inserted into the female connector member 22 and the attachment clip 30 is moved toward the female connector member such that its attachment legs 36 are forced outwardly and then snap back inwardly to engage their window attachment surfaces 40 with the attachment surface 46. Also, the construction of the attachment surface 46 in cooperation with the construction of the attachment clip 30 prevents disassembly of the fluid coupling when force is exerted that tends to withdraw the tube member 26 from the female connector member 22. Specifically, the intermediate portion 44 of the attachment edge 40 is captured in what may be termed an undercut manner by the attachment surface 46. Force tending to withdraw the tube member 26 from the female connector member 22 forces the attachment legs 36 inwardly to prevent disassembly. Also, since the attachment edges 40 are in the planes of their associated attachment legs 36, a stronger construction results since there is no tendency to bend as is the case with prior art attachment clips having bent tabs. Nevertheless, a suitable tool such as a screwdriver can be utilized to flex each attachment leg 36 outwardly in a manner that permits disassembly of the attachment clip 30 from the female connector member 22 as each attachment edge 40 is moved outwardly past the outer portion 52 of the attachment surface 46.

As previously mentioned in connection with FIGS. 1 and 2, the attachment surface 48 engaged by the central portion 32 of the attachment clip is on the tube member 26 and the attachment surface 46 engaged by the attachment edges 40 of the attachment clip is on the female connector member 22 which is the most preferred construction of the quick connect fluid coupling.

Figure 4:
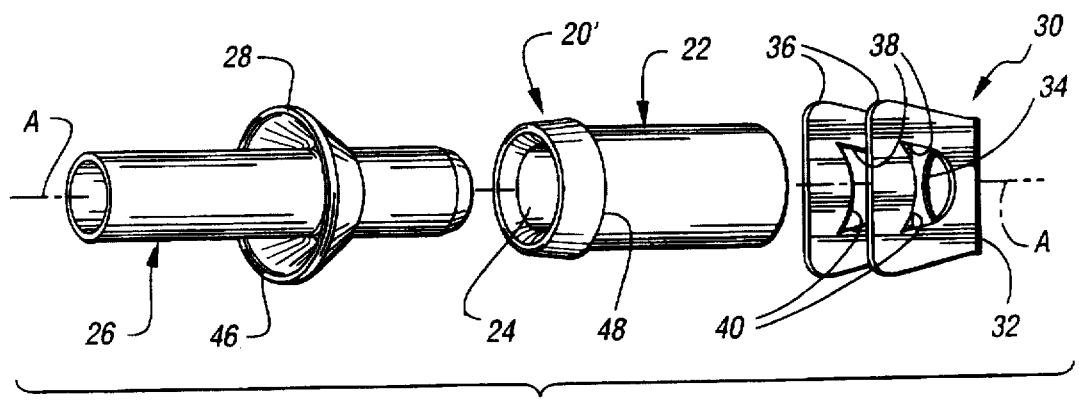
Figure 5:
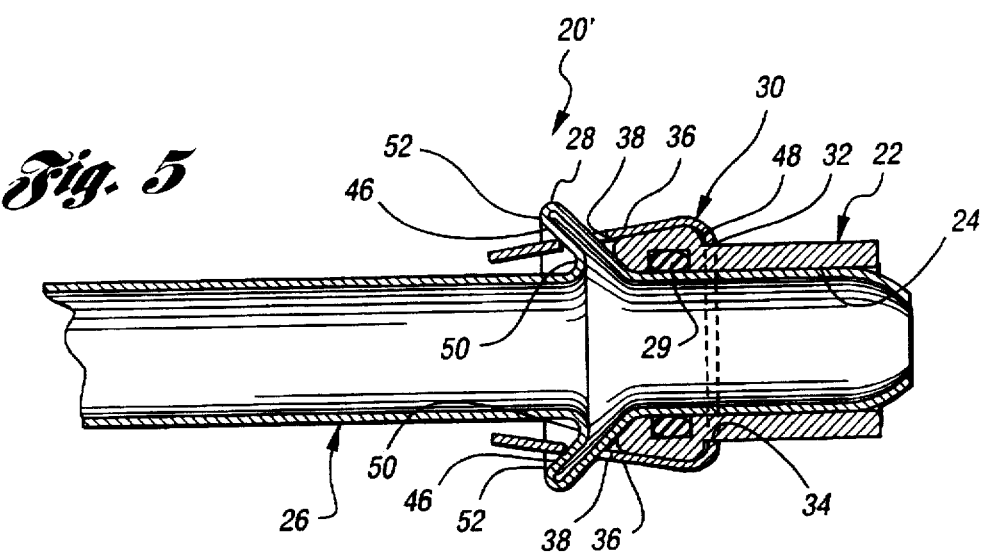
FIG. 5 is a longitudinal sectional view through the assembled fluid coupling illustrated in FIG. 4.

With reference to FIGS. 4 and 5, another embodiment 20' of the quick connect fluid coupling has the same construction as the previously described embodiment except as will be noted such that like reference numerals are applied to like components thereof and most of the previous description is applicable such that it need not be repeated. However, this embodiment of the fluid coupling 20' has the respective locations of the attachment surfaces 46 and 48 reversed from the previously described embodiment with respect to their locations on the female connector member 22 and the tube member 26. More specifically, in this embodiment, the attachment surface 48 engaged by the central portion 32 of the attachment clip 30 is on the female connector member 22, and the attachment surface 46 engaged by the attachment edge 40 of each attachment clip leg 36 is on the tube member 26. Thus, in this embodiment, the annular flange 28 of the tube member 26 has its attachment surface 46 provided with inner and outer portions 50 and 52 that are located with respect to the central portion 32 and attachment edges 40 of the attachment clip in the same manner previously described in connection with the embodiment of FIGS. 1 and 2.

While it is possible for the attachment clip 30 to have more than two legs, such as three, four, etc., the most preferred construction of the attachment clip includes only a pair of the attachment legs 36. Only two legs reduces the material stock needed and provides a good compromise between facilitating disassembly of the fluid coupling when necessary while still having the requisite strength for maintaining the coupling assembled when axial force is applied tending to withdraw the tube member from the female connector member as previously described.

Figure 6:
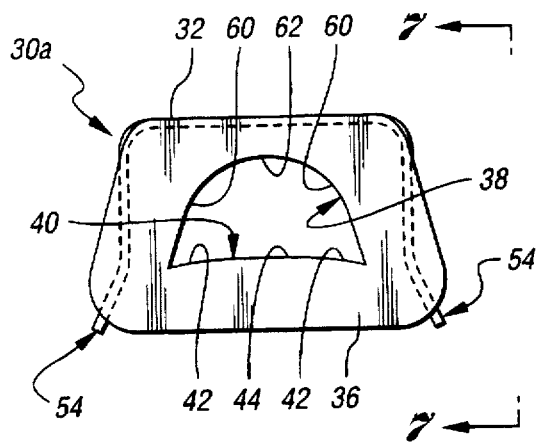
FIG. 6 is a side view of another embodiment of the attachment clip which includes positioners having ends for engaging the attachment legs of the clip.
Figure 7:
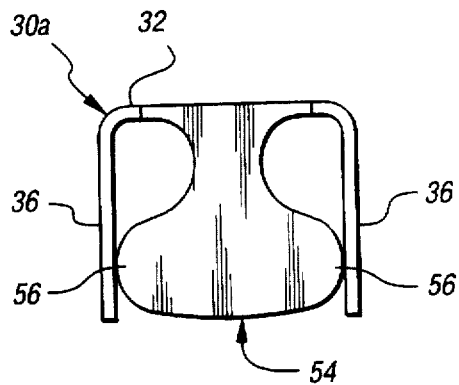
FIG. 7 is an end view of the attachment clip taken along the direction of line 7—7 in FIG. 6.
Figure 8:
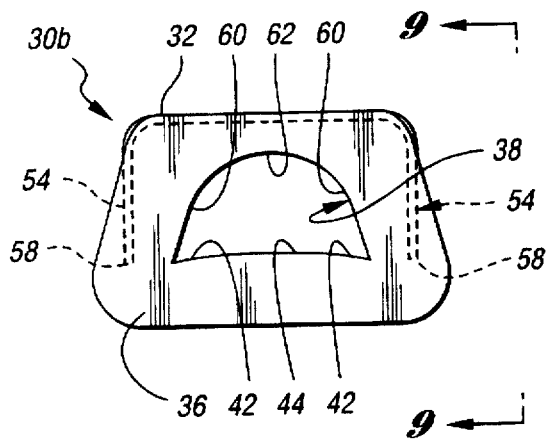
FIG. 8 is a side view of another embodiment of the attachment clip which includes positioners having distal ends that are spaced from the attachment legs.
Figure 9:
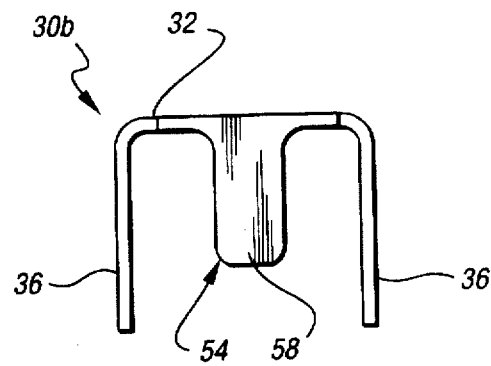
FIG. 9 is an end view of the attachment clip taken along the direction of line 9—9 in FIG. 8.

With reference to FIGS. 6,7 and 8,9, two additional embodiments of the attachment clip 30a and 30b are respectively shown. Each of these embodiments of the attachment clip includes a pair of positioners 54 that extend from the central portion 32 and are respectively located between the pair of attachment legs 36 of the attachment clip. As illustrated in FIGS. 6 and 7, the attachment clip 30a has its positioners 54 each provided with opposite ends 56 for respectively engaging the pair of attachment legs 36 to limit inward movement thereof as force is applied tending to withdraw the tube member from the female connector member. Each positioner 54 also engages the member whose attachment surface is engaged by its attachment edge 40 to cooperate therewith in positioning the attachment clip in the assembled position. Further, as illustrated in FIGS. 8 and 9, the attachment clip 30b has each of its positioners 54 provided with a distal end 58 located remote from the central portion 32 of the clip and spaced from the pair of attachment legs 36 as best illustrated in FIG. 9. The distal ends 58 of the leg positioners 54 of this embodiment engage the member having the attachment surface that is also engaged by the attachment edge 40 of each attachment leg 36 of the attachment clip.

Each embodiment of the attachment clip as best illustrated in FIG. 3 has its window 38 provided with the attachment edge 40 thereof having a curved shape along its intermediate portion 44 extending between the opposite ends 42. Also, the window 38 has side edges 60 that respectively extend from the opposite ends 42 of the attachment edge 40 and that taper toward each other in a direction toward the central portion 32 of the attachment clip. Furthermore, the window 38 of each leg 36 of the attachment clip has a curved connection edge 62 that connects the side edges 60 thereof in a spaced relationship from the attachment edge 40 thereof from whose ends 42 the side edges extend.

Figure 11:
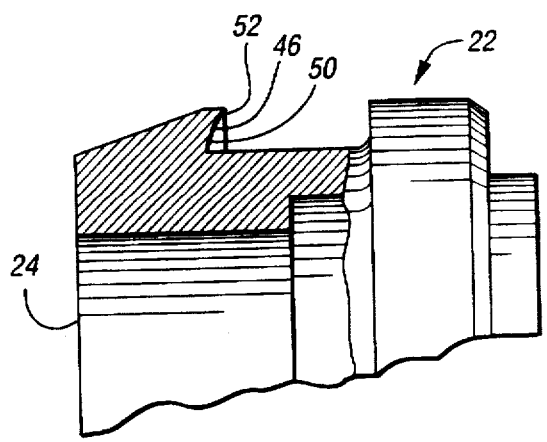
FIG. 11 is a partial view similar to FIG. 10 of another embodiment of the female connector member whose attachment surface has an annular construction with a curved shape in a cross-sectional direction as illustrated.

With reference to FIGS. 10 and 11, the attachment surface 46 that is engaged by the attachment edges of the attachment clip can have different shapes. Specifically as illustrated in FIG. 10, the attachment surface 46 has a frustoconical shape extending between its inner and outer portions 50 and 52 on the female connector member shown, which is the same as the frustoconical shape of the attachment surface 46 on the tube flange 28 as illustrated in FIG. 5. Furthermore, as illustrated in FIG. 11, the attachment surface 46 has an annular construction with a curved shape in a cross-sectional direction as illustrated extending between the inner and outer portions 50 and 52.

With reference to FIG. 1, the fluid coupling illustrated has its female connector member 22 provided with a mounting end 64 that can be mounted as shown in FIG. 2 on an object 66 with which the coupling is to be utilized, such as a brake component, a transmission housing or a fuel system component, etc. This mounting can be provided by a threaded connection, welding, brazing or any other suitable type of connection.

Figure 2A:
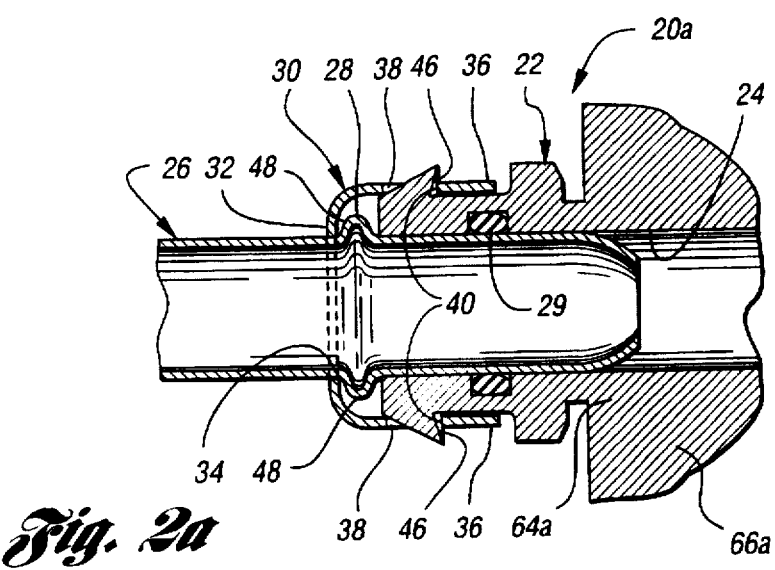
FIG. 2a is a longitudinal sectional view similar to FIG. 2 but illustrating another embodiment of the quick connect fluid coupling whose female connector member has a mounting end that is formed in situ with an object for mounting the fluid coupling during use.

In another construction of the fluid coupling identified by 20a in FIG. 2a, the female connector member 22 has its mounting end 64a formed in situ with the object 66 with which the fluid coupling is to be utilized. Specifically, the female connector member is illustrated as being cast from metal with the mounting end 64a thereof cast with the object 66a which as mentioned above can be a vehicle brake component, a transmission housing or a fuel system component, etc.

While the best modes for carrying out the invention have been described in detail, those familiar with the art to which this invention relates will recognize various alternative designs and constructions for practicing the invention as defined by the following claims.

What is claimed is:

1. In a quick connect fluid coupling including a female connector member having a central passage and also including a tube member that has an annular flange and is received by the passage of the female connector member in fluid communication therewith, the invention comprising:

an attachment clip having a central portion including an opening for receiving one of the members and having a plurality of flat attachment legs extending from the central portion in a spaced relationship to each other, each leg having a window including an attachment edge located within the plane of the flat shape thereof, and each attachment edge having opposite ends and an intermediate portion that extends between the ends thereof and that projects from the ends thereof toward the central portion; and the female connector member and the annular flange of the tube member each having an associated attachment surface, the attachment surface of one of the members being engaged by the central portion of the attachment clip, the attachment surface of the other member having an inner portion that is engaged by the intermediate portions of the attachment edges of the windows in the legs of the attachment clip to secure the female connector member and the tube member to each other, and the attachment surface of said other member having an outer portion that is located outwardly from the inner portion thereof and farther from the central portion of the attachment clip than its inner portion.

2. A quick connect fluid coupling as in claim 1 wherein the first mentioned attachment surface is on the tube member and the second mentioned attachment surface is on the female connector member.

3. A quick connect fluid coupling as in claim 1 wherein the first mentioned attachment surface is on the female connector member and the second mentioned attachment surface is on the tube member.

4. A quick connect fluid coupling as in claim 1 wherein the female connector includes a pair of the attachment legs located on opposite sides of the female connector.

5. A quick connect fluid coupling as in claim 4 wherein the attachment clip includes a pair of positioners extending from the central portion and respectively located between the pair of attachment legs.

6. A quick connect fluid coupling as in claim 5 wherein each positioner includes a pair of opposite ends for respectively engaging the pair of attachment legs and each positioner also engages the other member having the second mentioned attachment surface.

7. A quick connect fluid coupling as in claim 5 wherein each positioner includes a distal end that are spaced from the pair of attachment legs and that engage the other member having the second mentioned attachment surface.

8. A quick connect fluid coupling as in claim 1 wherein the intermediate portion of the attachment edge of the window in each leg of the attachment clip has a curved shape extending between the ends of the attachment edge.

9. A quick connect fluid coupling as in claim 1 wherein the window in each leg of the attachment clip has side edges that respectively extend from the opposite ends of the attachment edge thereof and that taper toward each other.

10. A quick connect fluid coupling as in claim 9 wherein the window in each leg of the attachment clip has a curved connection edge that connects the side edges thereof in a spaced relationship from the attachment edge thereof from whose ends the side edges extend.

11. A quick connect fluid coupling as in claim 1 wherein second mentioned attachment surface has a frustoconical shape.

12. A quick connect fluid coupling as in claim 1 wherein the female connector member has a mounting end for providing mounting thereof during use.

13. A quick connect fluid coupling as in claim 1 wherein the female connector member has a mounting end that is formed in situ with an object for mounting thereof during use.

14. In a quick connect fluid coupling including a female connector member having a central passage and also including a tube member that has an annular flange and is received by the passage of the female connector member in fluid communication therewith, the invention comprising:

an attachment clip having a central portion including an opening for receiving the tube member and having a pair of flat attachment legs extending from the central portion in a spaced relationship to each other, each leg having a window including an attachment edge located within the plane of the flat shape thereof, and each attachment edge having opposite ends and a curved intermediate portion that extends between the ends thereof and that projects from the ends thereof with its curved shape toward the central portion; and the female connector member and the annular flange of the tube member each having an associated attachment surface, the attachment surface of the annular flange of the tube member being engaged by the central portion of the attachment clip, the attachment surface of the female connector member having an inner portion that is engaged by the curved intermediate portions of the attachment edges of the windows in the legs of the attachment clip to secure the female connector member and the tube member to each other, and the attachment surface of the female connector member having an outer portion that is located outwardly from the inner portion thereof and farther from the central portion of the attachment clip than its inner portion.

15. In a quick connect fluid coupling including a female connector member having a central passage and also including a tube member that has an annular flange and is received by the passage of the female connector member in fluid communication therewith, the invention comprising:

an attachment clip having a central portion including an opening for receiving the tube member and having a pair of flat attachment legs extending from the central portion in a spaced relationship to each other, each leg having a window including an attachment edge located within the plane of the flat shape thereof, and each attachment edge having opposite ends and a curved intermediate portion that extends between the ends thereof and that projects from the ends thereof with its curved shape toward the central portion, and the attachment clip including a pair of positioners extending from the central portion thereof and respectively located between the pair of attachment legs; and the female connector member and the annular flange of the tube member each having an associated attachment surface, the attachment surface of the annular flange of the tube member being engaged by the central portion of the attachment clip, the attachment surface of the female connector member having an inner portion that is engaged by the curved intermediate portions of the attachment edges of the windows in the legs of the attachment clip to secure the female connector member and the tube member to each other, and the attachment surface of the female connector member having an outer portion that is located outwardly from the inner portion thereof and farther from the central portion of the attachment clip than its inner portion.

* * * * *